United States Patent
Spencer

(10) Patent No.: US 6,437,687 B2
(45) Date of Patent: Aug. 20, 2002

(54) ALARM MECHANISM

(75) Inventor: Joseph C. Spencer, Coldwater, MI (US)

(73) Assignee: Douglas Autotech Corp., Bronson, MI (US)

( * ) Notice: Subject to any disclaimer, the term of this patent is extended or adjusted under 35 U.S.C. 154(b) by 0 days.

(21) Appl. No.: 09/871,188

(22) Filed: May 31, 2001

Related U.S. Application Data

(60) Provisional application No. 60/208,181, filed on May 31, 2000.

(51) Int. Cl.$^7$ ................................................. B60Q 1/00
(52) U.S. Cl. .................... 340/425.5; 340/438; 340/439; 340/457; 340/458; 340/905
(58) Field of Search .............................. 340/425.5, 429, 340/435, 436, 437, 438, 439, 901, 905, 457, 458

(56) References Cited

U.S. PATENT DOCUMENTS

| | | | |
|---|---|---|---|
| 5,259,487 A | | 11/1993 | Petek |
| 5,284,330 A | | 2/1994 | Carlson et al. |
| 5,332,260 A | | 7/1994 | Heinrichs et al. |
| 5,449,199 A | | 9/1995 | Heinrichs et al. |
| 5,582,385 A | * | 12/1996 | Boyle et al. ............. 248/550 |
| 5,652,704 A | | 7/1997 | Catanzarite |
| 5,709,281 A | * | 1/1998 | Sherwin et al. ........... 180/272 |
| 5,765,116 A | * | 6/1998 | Wilson-Jones et al. ...... 701/41 |
| 5,878,851 A | * | 3/1999 | Carlson et al. ............ 188/269 |
| 6,053,269 A | * | 4/2000 | Patten ..................... 280/167 |
| 6,091,321 A | * | 7/2000 | Karell .................... 340/425.5 |

* cited by examiner

Primary Examiner—Jeffery Hofsass
Assistant Examiner—Hung Nguyen
(74) Attorney, Agent, or Firm—Barry C. Kane; Miller, Johnson, Snell & Cummiskey, PLC

(57) ABSTRACT

An alarm assembly is provided alerting the operator through one of a visual, audible, or tactile signal, the occurrence of a specified event. The alarm assembly includes a locking mechanism coupled to a substrate which has a natural frequency. The locking mechanism is maintained in a condition which inhibits the natural frequency of the substrate unless commanded to do so by an electronic circuit which includes sensors for monitoring one or more specific criterion. The locking mechanism is preferably a non-Newtonian flow fluid locking mechanism which uses a magneto-rheological fluid to dynamically adjust the locking strength of the locking mechanism as well as the natural frequency of the substrate based upon user inputs and dynamic events. The alarm assembly can be dynamically "tuned" in and out of the natural frequency of the substrate so the substrate vibrates, produces an audible noise, or generates a current upon the occurrence of a predetermined event. Sensors mounted on the substrate provide feedback via a logic system or computer to alter the stiffness of the locking system and increase or decrease the vibration to obtain or avoid the natural frequency.

19 Claims, 6 Drawing Sheets

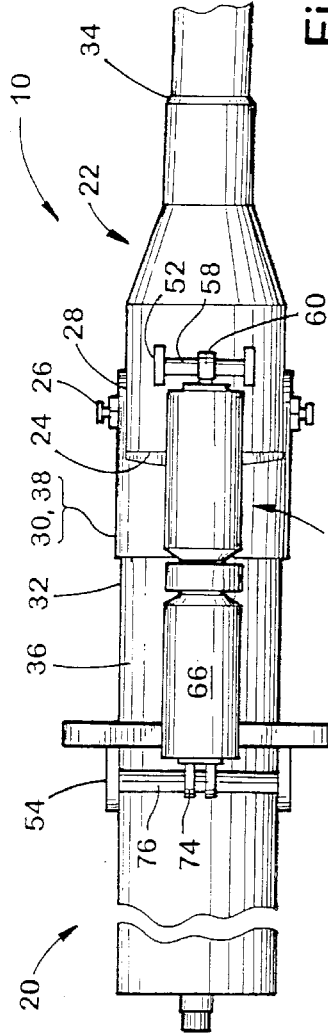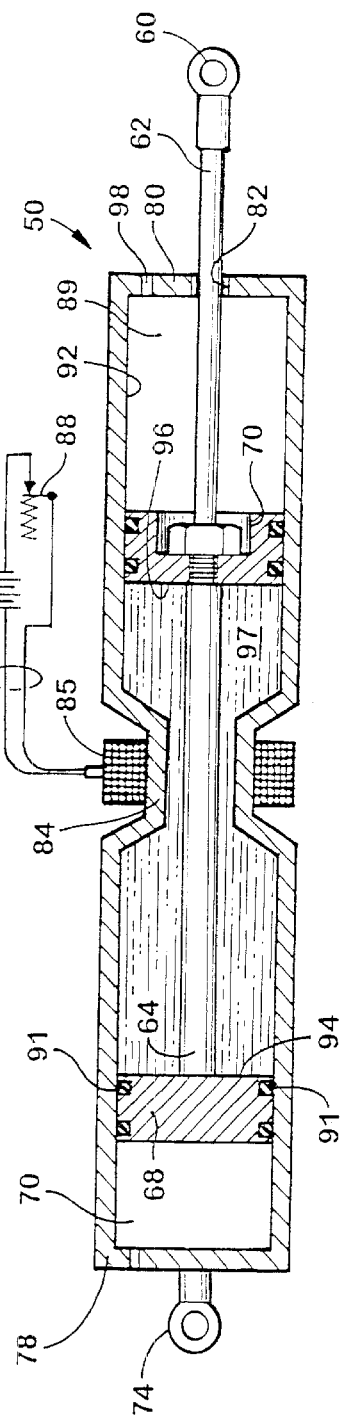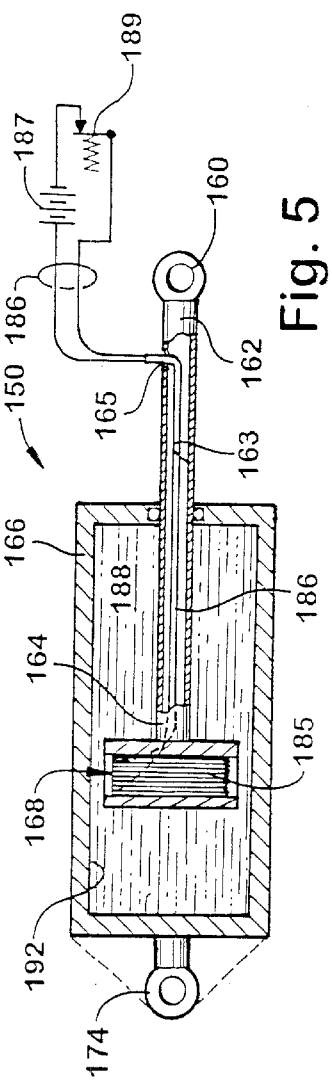

ALARM MECHANISM

CROSS REFERENCE TO RELATED APPLICATIONS

This application claims the benefit of provisional patent application serial No. 60/208,181 filed May 31, 2000, the specification of which is incorporated herein by reference

BACKGROUND OF THE INVENTION

1. Field of the Invention

This invention relates generally to alarm systems and particularly to a mechanism for actively alerting an operator of the occurrence of a specific condition requiring the attention of the operator.

2. Discussion of the Related Art

Substantially all mechanical devices, and in particular vehicles, have structures which have a "natural frequency." The "natural frequency" of a component is the frequency at which a system oscillates in the absence of external forces; or, for a system with more than one degree of freedom, the frequency of one of the normal modes of vibration. Particular care is given during the designing of these components to avoid the "natural frequency." The goal in most cases is to remove unwanted vibration to provide smooth and comfortable operation of the machine.

From an automobile manufacturer's viewpoint, the natural frequency of a component or assembly should be higher than a particular threshold, else the operator of the vehicle may detect some undesirable vibration, rattle, or "singing" during operation which is distracting, annoying, or disconcerting. Always, when an automobile manufacturer provides specifications to outside or third party vendors/suppliers, the natural frequency floor for the desired component/assembly is usually set out and is to be avoided. To the best of the inventor's knowledge, never has the natural frequency of a component been used to alert the operator of a condition.

SUMMARY OF THE INVENTION

The instant invention is an apparatus for interconnecting two objects together and permits the relative position of the two objects to be adjusted while the device is in a first state, and fixes the relative position of the two objects while the device is in a second state. The state of the device can be dynamically driven, and in particular, "tuned" to either avoid, or induce, the natural frequency of the coupled structures.

The apparatus embodying the invention includes a housing having at least one movable piston inside. Also inside the housing is a non-Newtonian flow fluid which passes through at least one passage within the housing. Adjacent the passage, or in close proximity thereto, is a device for selectively generating or neutralizing a magnetic field in and around the passage. The fluid within the housing flows through the passage when the magnetic field is weak or absent permitting the piston to move. When the magnetic field surrounding the passage reaches a predetermined strength, the fluid undergoes a change and ceases to flow, locking the relative position of the piston within the housing. If the strength of the field is increased, the effect of the field extends beyond that of the passage, and renders the device to be more rigid.

In one form of the invention, the invention is used to adjustably fix the relative position of the two interconnected components. The novel assembly includes an upper housing assembly coupled to a lower housing assembly in a manner to permit at least one of the upper and lower housing assemblies to articulate and telescope relative to the lower housing assembly. At least one non-Newtonian flow fluid-locking mechanism interconnects the upper housing assembly to the lower housing assembly for selectively fixing their relative positions. It is contemplated the apparatus includes a device for generating a magnetic field around at least a portion of the non-Newtonian flow fluid-locking mechanism for selectively activating and deactivating the fluid-locking mechanism. An electronic circuit and sensors are interconnected to the non-Newtonian flow fluid-locking device to dynamically adjust the strength of the magnetic field, thereby adjusting the rigidity of the locking mechanism. In the event the sensors detect the occurrence of a predetermined event, the strength of the magnetic field in the locking mechanism is changed to match the natural frequency of the component which produces one of an audible, tactile or visible signal to the operator. For example, in the event a sensor detects an object adjacent the left side of the vehicle, the circuit may be programmed to increase the magnetic field in the locking mechanism which controls the turn rate of the steering wheel, essentially providing tactile feed back to the operator which makes it more difficult to turn left and into the obstacle.

In yet another form of the invention, it is contemplated that the invention may be used to lock the rotation of the steering column, and act as a vehicle anti-theft system in the event the vehicle is broken into. The system would not deactivate until the key was inserted or some other system releases the device. Additionally, it is contemplated that the invention may be used to fix the relative position of seats, control pedals, and other objects within a vehicle, or match the natural frequency of those components such that they vibrate and provide a physical stimulus to the operator.

In still another form of the invention, an adjustable steering column is provided which is capable of tilting, telescoping, or both to the operators desired position. The locking system provided to fix the desired position of the steering column is dynamically adjusted or "tunable" in and out of the natural frequency of the steering column so the steering column vibrates upon the occurrence of a predetermined event. Sensors are mounted on the steering column to provide feedback via a logic system or computer to alter the stiffness of the locking system and increase or decrease the vibration of the column. For example, sensors could monitor the operator's eyes and determine when he/she has fallen asleep. If a condition is met, the locking mechanism is adjusted to permit the column to vibrate, and wake-up the operator. Once the condition is no longer satisfied, the system is tuned so the vibration stops and returns to normal operation. Similar systems could be used with seats, shift levers, control pedals, and the like.

These and other objects, advantages, purposes, and features of the invention will become more apparent from a study of the following description taken in conjunction with the drawing figures described below.

BRIEF DESCRIPTION OF THE DRAWING FIGURES

FIG. 3 is a bottom plan view of the invention shown in FIG. 2;

FIG. 4 is a schematic section view of one embodiment of the invention shown in FIGS. 2 and 3;

FIG. 5 is a schematic section view of an alternate embodiment of the invention shown in FIGS. 2 and 3;

DETAILED DESCRIPTION OF THE PREFERRED EMBODIMENTS

Figure 2:
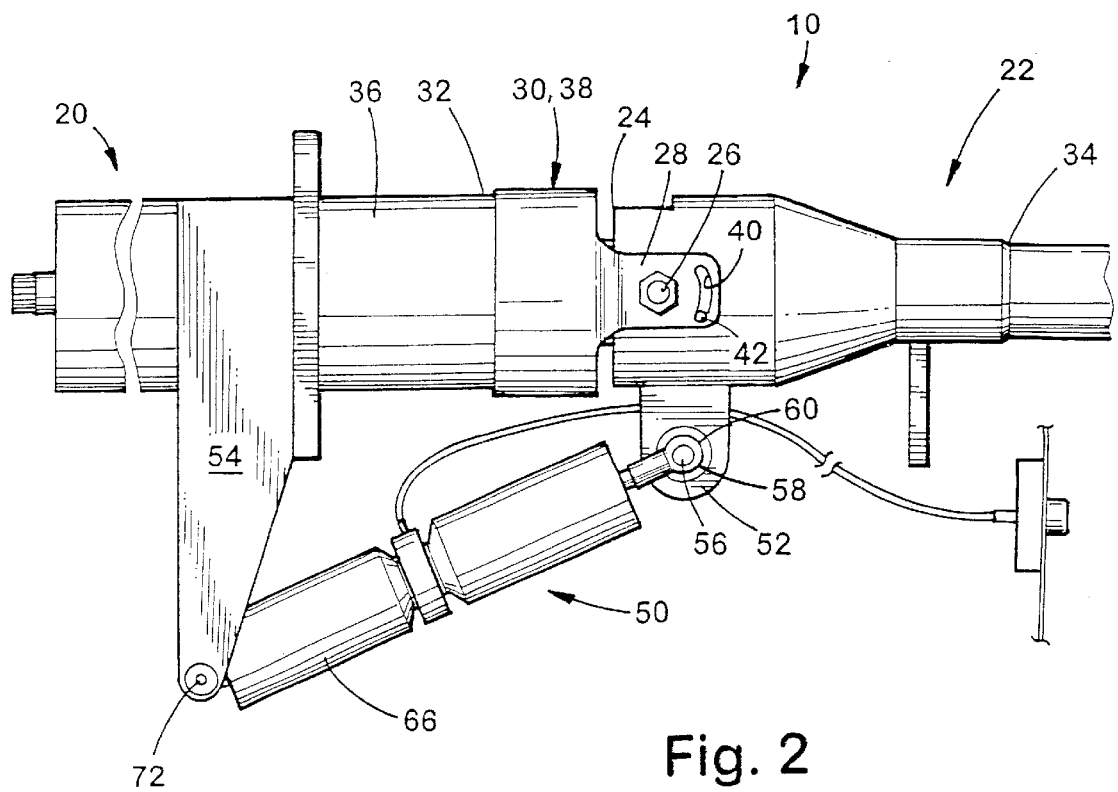
FIG. 2 is an enlarged elevation view of the invention shown in FIG. 1.

For purposes of the following description, the terms "upper," "lower," "right," "left," "rear," "vertical," "horizontal" and derivatives thereof shall relate to the invention as oriented in FIG. 2. However, it is to be understood that the invention may assume various alternative orientations except where expressly specified to the contrary. It is also to be understood that the specific devices and processes illustrated in the attached drawings, and described in the following specification, are simply exemplary embodiments of the inventive concepts defined in the specification and any appended claims. Specific dimensions and other physical characteristics relating to the embodiments disclosed herein are not to be considered as limiting, unless the claims expressly state otherwise.

Although the instant invention has application to substantially any situation where it is desirable to prompt an operator to the occurrence of an event, the following description is made with specific reference to applications in vehicles, and more to a steering column where it is common to provide tilt and/or telescoping movement of one component (the steering wheel) relative to another (the steering column).

Figure 1:
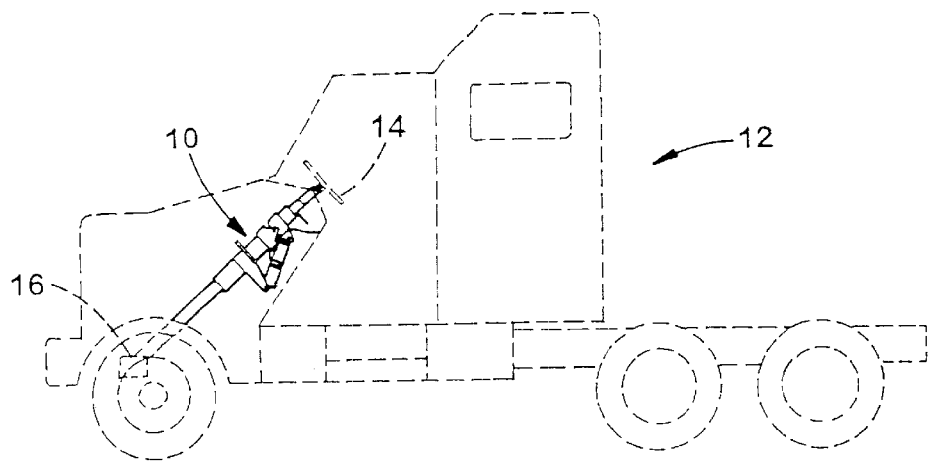
FIG. 1 is a schematic diagram of one environment of application of the instant invention.

Referring to drawing FIGS. 1 through 3, a steering column assembly 10 is shown mounted in a vehicle 12 such as a truck, wherein a steering wheel assembly 14 is provided at one end, and the opposite end is interconnected to a steering gear box 16 for steering the front wheels of the vehicle 12. The upper portion of the steering column assembly 10 (FIG. 2) includes a lower housing assembly 20 interconnected to the upper housing assembly 22 in a manner to permit articulation or tilting of the upper housing assembly 22 relative to the lower housing assembly 20, translation or telescoping motion of the upper housing assembly 22 relative to the lower housing assembly 20, or both. In the embodiment shown, upper housing assembly 22 is pivotally coupled at its lower end 24 by pins 26 to arms 28 of a yoke 30 attached to the upper end 32 of the lower housing assembly 20. The pivot axis defined by pins 26 is preferably substantially horizontal to provide for a limited arc of rotation in a vertical plane.

The upper and lower housing assemblies 22 and 20, respectively, of the steering column assembly 10 enclose a series of interconnected rotatable shafts (not shown) connected at one end to the steering wheel assembly 14 and at an opposite end to a steering gear box 16. A universal joint or similar coupling interconnects the shafts to permit tilt movement of the upper housing assembly 22 relative to lower housing assembly 20. A telescoping shaft may be attached to the upper shaft to permit longitudinal adjustment of the steering column assembly 10.

Lower housing assembly 20 generally includes a tubular member 36 preferably made from steel with a collar 38 securely attached to the upper end 32 by weldment or similar coupling. Arms 28 of a yoke 30 diverge and extend outwardly from a longitudinal axis of the lower housing assembly 20 to a distance sufficient to receive the upper housing assembly 22 there between. Generally arcuate openings 40 are provided at the distal ends of each arm 28 to receive a guide pin 42 attached to the upper housing assembly 22. The guide pins 42 interact with the arcuate openings 40 to define the tilt limits of the upper housing assembly 22 with respect to the lower housing assembly 20. In the illustrated embodiment, arms 28 of the yoke 36 are stamped or otherwise formed from steel bar stock and have the lower ends welded to the collar 38 to produce a rigid fork attachment at the upper end 32 of the lower housing assembly 20. Additional information and alternatives on the nature of the pivotal coupling between the upper housing assembly 22 and the lower housing assembly 20 are disclosed in U.S. Pat. No. 5,899,487, granted May 11, 1999.

Referring to the embodiment shown in FIGS. 2 and 3, the lower and upper housing assemblies 20 and 22, respectively, are interconnected by locking mechanism 50, preferably at points vertically offset from the horizontal mid-line of the steering column assembly 10, and most preferably at a point farthest from the pivot access defined by pins 26. The upper housing assembly 22 has at least one, and preferably two flanges 52 extending generally perpendicular at a point proximate the lower end 24 to define a bracket. A similar structure extends perpendicular from tubular member 36 or from collar 38 generally identified by reference numeral 54. Attached to bracket 54 by a pin 56, and centered between bushings 58, is one end of the locking mechanism 50. The opposite end of the locking mechanism 50 is pivotally coupled to bracket 54.

FIG. 4 schematically illustrates an embodiment of a locking mechanism 50 used in combination with the instant invention. Locking mechanism 50 is preferably a fluid-locking mechanism having a housing 66, preferably in the shape of a right circular cylinder closed at end 78, and having an opening 82 at an opposite end 80 of sufficient diameter to permit the passage of shaft 62 there through. The central or intermediate portion 84 of housing 66 has a reduced intermediate portion (RIP) to create a constriction generally uniformly around shaft 62. The specific dimension of RIP 84 will vary depending upon the diameter of shaft 62. RIP 84 essentially divides the housing 66 into two chambers 89 and 90, each containing a respective piston 68 and 70. Pistons 68 and 70 each have a diameter substantially equal to the interior diameter of the respective chambers. O-rings or similar acting seals 91 may extend around the circumference of each piston 68 and 70 to form a tight seal with the interior wall 92 of the chambers 89 and 90. A specific volume is defined between the interior surfaces 94 and 96 of the pistons 68 and 70, respectively, and the interior wall 92. Disposed within this volume is a non-Newtonian flow fluid 97 such as that disclosed in any one of U.S. Pat. Nos. 5,277,281; 5,284,330; 5,492,312; 5,816,372; and 5,711,746, all assigned to the Lord Corporation. The portions of the respective chambers outboard of the pistons 68 and 70 may be filled with ambient air passing through holes 98 extending through the walls of ends 78 and 80.

Disposed around housing 66 adjacent RIP 84 is a device for generating a magnetic field within the interior of the housing 66 and particularly across the inside diameter of RIP 84. In one embodiment, the device 84 includes a electromagnet coil 85 operably connected by conductors 86 to a power supply 87. The flow of current through conductors 86 and electromagnet coil 85 is controlled by a switch 88 mounted in either the steering wheel, or a module mounted in or near the column and possibly activated by a lever. The actual mounting method or location is not important so long as it is reasonably accessible by the operator. In this embodiment, depression of switch 88 interrupts the power to electromagnet coil 85. Alternatively, the device surrounding RIP 84 may include a split annular magnet. Each half of the magnet would be coupled to a mechanical linkage which would move each magnet toward or away from RIP 84 to engage and disengage the mechanism. In yet another form, permanent magnets may be mounted around RIP 84 of sufficient shape and size to produce a magnetic field or flux across the inside of RIP 84. Arranged around the outside of the magnets may be a wire coil similar to 85 coupled to a circuit by conductors. The circuit may be designed such that when activated, the electromagnetic force produced by the electromagnet coil 85 would counter the magnetic field produced by the magnets, canceling each other to produce a field force region across RIP 84, and allowing the fluid to move between the chambers.

All forms of the device are preferably operably connected to a crash sensor to interrupt the supply of power, disengage or neutralize the magnets to unlock the mechanism. In this manner, a substantial portion of the impact could be absorbed by the mechanism rather than by the occupant.

In operation, a bias on conductors 86 produced by the power supply 87 causes electromagnet coil 85 to produce a magnetic field across the non-Newtonian flow fluid in chambers 89 and 90 and most particularly across the interior of the restriction produced by RIP 84 and the intermediate portion of shaft 62. The field causes the fluid within that region to alter state sufficient to prevent the fluid to pass through the RIP 84, and locks pistons 68 and 70 in place. This magneto-rheological condition firmly fixes the relative position of the shaft 62 with respect to the housing 66 which in turn fixes the relative position of the upper housing assembly 22 with respect to the lower housing assembly 20. In order to change the relative position of the upper housing assembly 22, the operator depresses switch 88, a lever, or other input device to interrupt the field across RIP 84 and allowing the fluid to change state and flow through the passages defined between RIP 84 and shaft 62. By permitting the pistons 68 and 70 to translate within the respective chambers 89 and 90, the operator can then change the relative position of the upper housing assembly 22 with respect to the lower housing assembly 20. Releasing the switch 88 restores the magnetic field which then in turn prevents the flow of fluid between the respective chambers 89 and 90. In the case of an electromagnet, the force necessary to change the position of the pistons 68 and 70 may be varied—in essence fine tuning the locking mechanism 50. Resistance could be varied by changing the volume or size of the passage through which the fluid migrates as the piston moves. Other available modifications include changing the diameter of the pistons 68 and 70, or changing the diameter of the piston passing through the RIP 84. A change in one or more of these elements produces a change in the amount of force necessary to move the piston and attached shaft 62.

FIG. 5 illustrates an alternate embodiment of the locking mechanism 50 using a single piston design 150. The single piston design 150 includes a shaft 162 having a connector 160 at one end which is configured to be coupled to brackets 52 or 54 using the same type of pin 56 and bushing 58 arrangements described earlier. The opposite end of the shaft 164 terminates in piston 168 which may include a coil of wire to form an electromagnet coil 185. The leads from the electromagnet coil 185 may extend up through a central hollow core 163 of the shaft 162 and exit a port 165 proximate the connector 160. There the conductors 186 are interconnected to a switch 189 and a power supply 187 which selectively energizes the electromagnet coil 185.

Piston 168 and a portion of the shaft 162 are disposed within a chamber 188 defined by housing 166. The external diameter of the piston 168 may vary in dimension from a size substantially equal to the inside diameter of the chamber 188 or be of a lesser size to control the dimension or space between the perimeter of the piston 168 and the interior wall 192 (hereafter the "perimeter volume") which provides the same function as RIP 84 above. Chamber 188 to the housing 166 is filled with the non-Newtonian flow fluid. The entire housing 166 is preferably sealed including the passage through which shaft 162 extends in order to prevent the fluid from leaking. Although single seals are shown in the drawing figure, it is anticipated that a number of redundant seals and bushings may be used to retain the fluid within the chamber 188 and prevent a robust seal.

With the two connectors 160 and 174 pivotally secured to the respective brackets 52 and 54, and with a bias supplied over conductors 186 to energize electromagnet coil 185, the non-Newtonian fluid is unable to pass between the perimeter of the piston 168 and the interior wall 192 creating a condition where the piston 168 and shaft 162 are rigidly secured with respect to the housing 166. Upon the operator's selection and depression of switch 188 and interruption of the power along conductors 186, the fluid state changes and passes about the periphery of the-piston 168 to permit a change of position of the column. Although not shown, it is anticipated that piston 168 may substantially extend across and fill the interior of the housing 166. In order to permit the passage of the fluid, ports may extend through the piston which could be metered using jets to adjust the resistance.

In both of the embodiments described above, the locking device is functioning in a Coulomb or Bingham lock, i.e., this configuration approximates an ideal lock in which the force generated is independent of piston velocity and large forces can be generated with low or zero velocity. This independence improves controllability of the lock making the force a function of the magnetic field strength, which is a function of the current flow in the circuit or the field strength produced by an adjacent magnet. In basic terms, the flow of magnetic flux is dependent on several factors in the flow path. The minimum lateral cross-sectional area of the piston (68, 70 or 168) within the windings of the electromagnet coil 185; the minimum lateral cross-sectional area of magnetically permeable material finding a return path from magnetic flux; and a surface area of the magnetic pull of the piston, all having values as defined in U.S. Pat. No. 5,284, 330.

The instant invention may also be used to reduce the deceleration impact of the operator with the steering column in the event of a crash. This is accomplished by interrupting the conductors 186 using a switch operably connected to a crash sensor in the vehicle. At the specified threshold, the sensor interrupts the bias in the conductors 186, thus deactivating the electromagnet coil 185 and allowing the steering column to be repositioned. In a preferred embodiment, a pyrotechnic actuator may be attached to the bracket 52 on the lower side of upper housing assembly 22 so in the event of a crash, the locking mechanism 50 is de-energized and the pyrotechnic pre-positioning system pulls the steering column downward and away from the operator so that the air bag within the steering wheel deploys to more fully absorb any impact.

Figure 6:
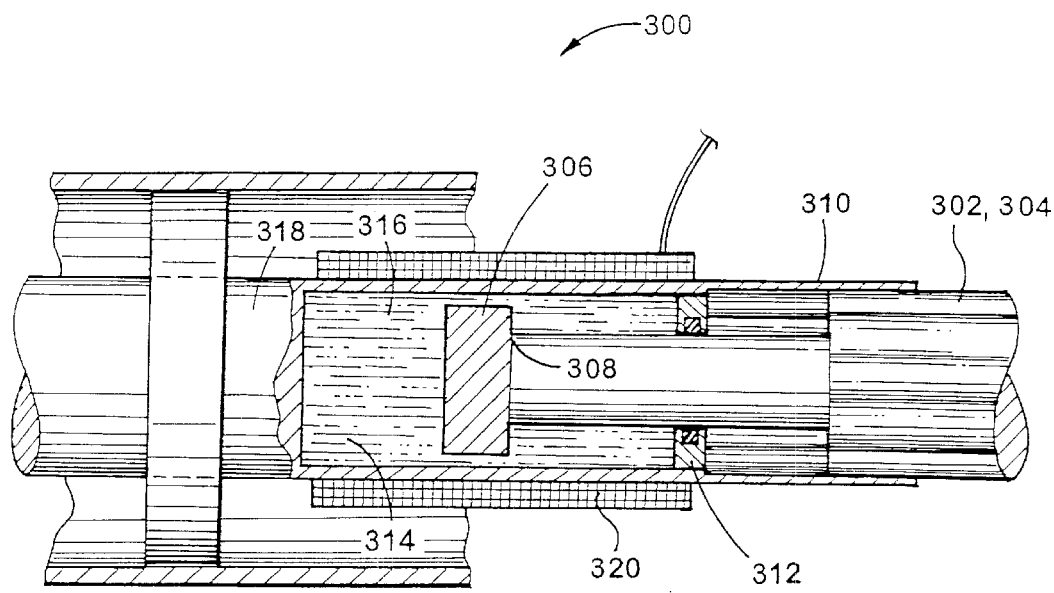
FIG. 6 is a schematic section view of an embodiment of the invention in a telescoping assembly.

In reference to FIG. 6, a portion of a telescoping steering column assembly 300 is shown comprising a shaft 302 configured at one end 304 to attach to the steering wheel. The opposite end of the shaft terminates in a piston 306 having a diameter slightly less than the diameter of the shaft 302. The piston 306 is coupled to shaft 302 by a neck 308. Piston 306 and the necked-down portion 308 of shaft 302 are received in a cylinder 310 closed by seal 312 to define a fixed volume 314 similar to that defined by the housing 166 and piston 168 in the embodiment shown in FIG. 5. The volume 314 is filled with the non-Newtonian flow fluid 316 to completely envelope the piston 306 and the portion of the shaft 302 extending through the seal 312. The cylinder 310 may be formed in one end of shaft 318 which forms the remaining portion of the shaft in the upper or lower housing. To prevent rotation of shaft 302 relative to shaft 318, splines may be provided along the upper interior or end of shaft 318 and above neck 308. The splines would permit axial translation, but fix the two shafts rotationally. The respective shafts 310 and 302 are preferably journaled by bearings well known in steering technology.

In this configuration, it is anticipated that an electromagnetic coil 320 may be disposed on the exterior portion of the upper end of the shaft 318 to create the magnetic flux in the non-Newtonian flow fluid 316 disposed within the chamber 314 sufficient to prohibit the fluid from passing through or around the perimeter of the piston 306. In the alternative, it is contemplated that the shaft 302 may be hollow to provide a passage for conductors to a coil formed in the interior of the piston 306 to create the necessary magnetic flux. The circuit used may be similar to that described above and could be used in combination with the crash sensors so the relative telescoping position of the shaft 302 may be changed with respect to the shaft 318.

Figure 7:
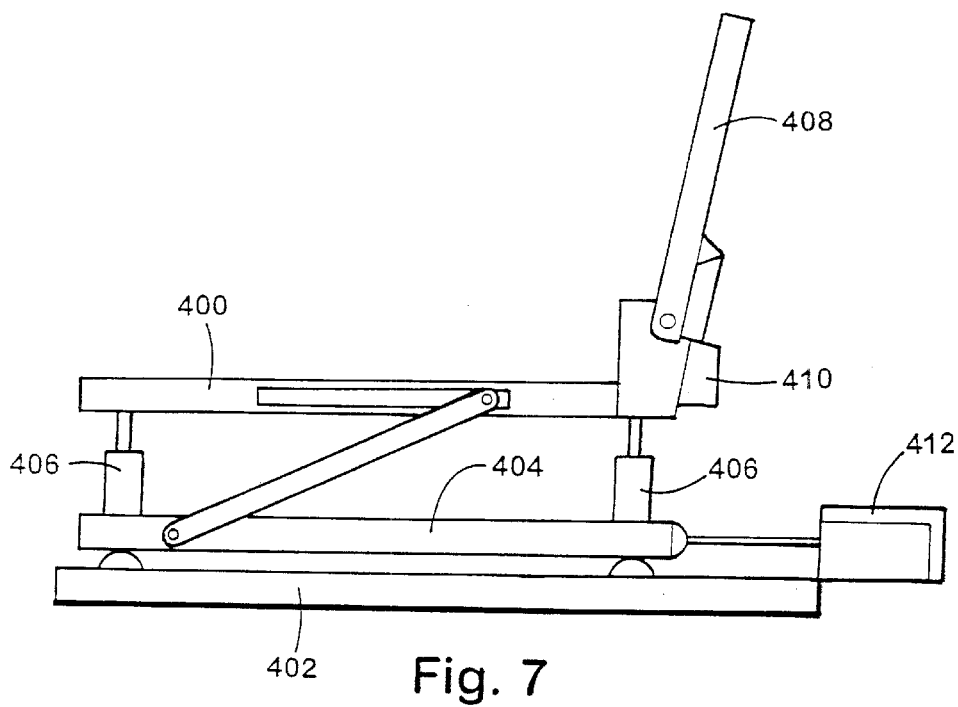
FIG. 7 is a schematic view of another application of the instant invention.

In yet another embodiment of the invention, the locking mechanism 50 may be used to control the relative height, recline angle of a seat back 408 and seat base 400; as well as the horizontal position of the seat with respect to the steering wheel. FIG. 7 schematically illustrates these various other applications. For example, the seat base 400 may be supported above a track 402 and mounted to a carriage 404 by a plurality of the locking devices generally identified as 406. In addition, the angular position of the seat back 408 may be controlled by a locking device 410 interconnected to the seat back 408 and the seat base 400. Lastly, horizontal travel of the carriage may be controlled by a locking device 412 mounted at one end to the floor or frame of the vehicle and at the opposite end to the carriage 404. Just as in the previous embodiments, one or all of these locking devices 406, 410, and 412 may be used to set the relative position of the seat components. In addition, pyrotechnic propositioning systems may be integrated to change the position of the seat in a crash.

Figure 8:
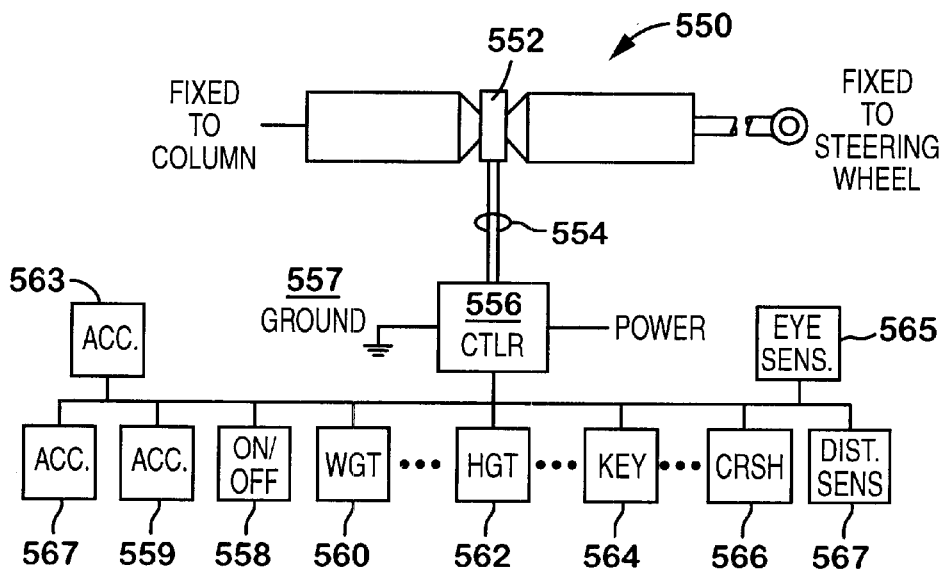
FIG. 8 is a schematic diagram illustrating a circuit used in combination with the instant invention to adjust the characteristics of the invention in response to specific input.

It was briefly mentioned above that the instant invention may be used to reduce the impact of the occupant with the steering wheel in the event of a crash. FIG. 8 shows, in schematic form, one assembly for achieving that function. In this embodiment, the locking device 550 includes a locking mechanism 552 operably coupled by conductors 554 to a controller 556 (CLR) which, in turn, is operably coupled to a ground 557 and a power source 555 for the circuit. Controller 556 has a plurality of inputs, including, but not limited to, a tilt adjustment switch 558, a weight sensor 560, a height sensor 562, an ignition sensor 564, and a crash sensor 566. Additional sensors could include accelerometers for indicating the direction of an impact and a sensor for measuring the speed of the vehicle.

Controller 556 may be a microchip, programmable logic controller, micro computer or other processor capable of utilizing data provided by the various sensors to determine the necessary current applied over conductors 554 to control the strength of the magnetic field produced by locking mechanism 552. That is to say the controller 556 would dynamically change the locking characteristics in accordance with the various inputs so any impact by the operator is absorbed by the column rather than the occupant. In addition, this same circuitry could include a memory circuit for recalling particulars about a particular incident, for example, the system may be able to indicate whether the operator was traveling a certain speed, and direction, and whether the seat belt was in use. The system could also record the impact direction and force. All of this information would be useful in determining the facts surrounding an accident. This same controller 556 may also include information stored by the operator on the preferred position of the column, the control pedals, the seat position, and the like.

Figure 9:
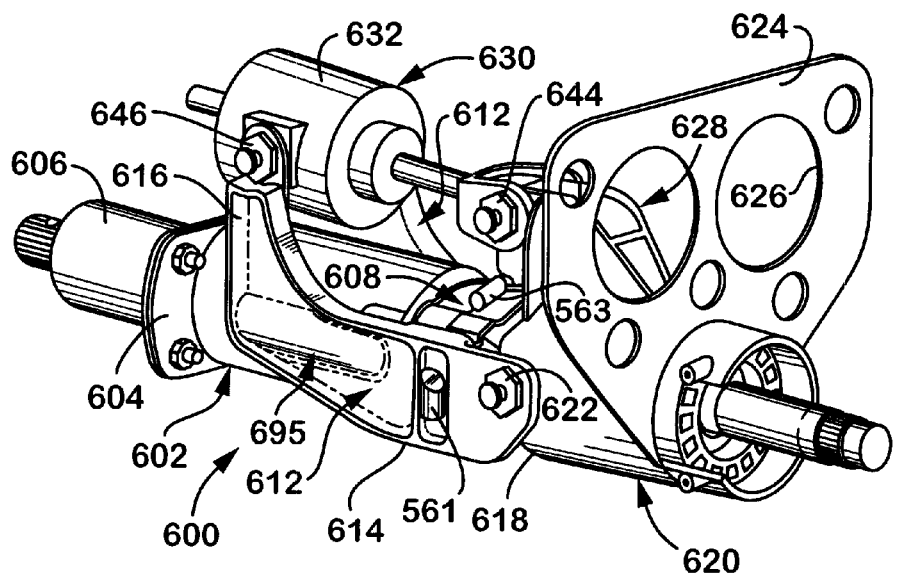
FIG. 9 is an oblique view of a tilting and telescoping steering column employing other embodiments of the instant invention.

FIG. 9 illustrates a steering column assembly 600 incorporating in the instant invention a tilting column, as well as a telescoping column. The steering column assembly 600 includes a lower housing assembly 602 which is intended to be secured by flanges 604 to a section 606 of the steering column which, in turn, may be attached to the fire wall, dash assembly, or other rigid structure in the vehicle. The interior of the lower housing assembly 602 is designed to receive a telescoping inner housing assembly or shuttle 608. The inner housing assembly or shuttle 608 is configured to slide within the lower housing assembly 602 between an extended or retracted position along an axis parallel to the longitudinal axis of the lower housing assembly 602. Inner housing assembly or shuttle 608 may be of a particular shape received within a correspondingly shaped passage formed in the interior of the lower housing assembly 602 with bearing surfaces provided to allow a smooth translation of the inner housing assembly or shuttle 608 with respect to the lower housing assembly 602. An end of the inner housing assembly or shuttle 608 extending from the lower housing assembly 602 may be fitted with a pair of brackets 612, and each disposed on opposite sides of the inner housing assembly or shuttle 608. Each bracket 612 may be generally L-shaped or dog-legged such that one portion of the leg 614 is securely attached to the end of the inner housing assembly or shuttle 608, and the other portion or leg 616 extends at an angle to leg 614 and generally tangential to the exterior of the lower housing assembly 602.

Pivotally coupled between the ends of legs 614 may be the lower end 618 of the upper housing assembly 620. The coupling could permit articulating motion of the upper housing assembly 620 with respect to the lower housing assembly 602 about an axis generally horizontal and defined by bolts 622. For specifics on the coupling between the bolts 622 and the attached components, the reader is referred to U.S. Pat. No. 5,899,497 issued on May 4, 1999. In the embodiment shown in FIG. 9, the upper housing assembly 620 also includes a bracket 624 of a predetermined dimension having a plurality of cutouts 626 to receive various gauges. Also extending from the upper housing assembly 620 proximate the lower end 618 is a buttressed flange 628. Buttressed flange 628 is interconnected to the lower legs 616 of each bracket 612 by a fluid locking mechanism identified by the reference numeral 630. A more detailed illustration of the fluid locking mechanism 630 is made with respect to FIG. 10.

Fluid locking mechanism 630 includes a housing 632 having at least one piston 634 slidably disposed therein to define at least two chambers 636 and 638. Extending from the piston 634 is a piston shaft 640 which extends from the housing 632 and terminates in a clevis 642. The clevis 642 may be pivotally attached to the buttressed flange 628 by one or more bolts 644(FIG. 9). Housing 632 is also similarly pivotally attached to the ends of the legs 616 by bolts 646 extending through the legs 616 and into mounting plates 648 formed on the exterior of the housing 632. With the fluid locking mechanism 630 in the unlocked state, the upper housing assembly 620 is permitted to tilt or pivot about the coupling point defined by bolt 622. The pivotal couplings provided by bolts 644 and 646 permit the angular orientation of the fluid locking mechanism 630 to vary as the upper housing assembly 620 is moved about the pivot point.

Referring again to FIG. 10, housing 632 is preferably cylindrical and opened at one end 650 to permit the insertion of various components therein. A piston shaft 640 extends through a sealed opening 652 defined in the opposite end 654 of the housing 632. Concentrically disposed in the interior wall 655 of the housing 632, and spaced inwardly away from the interior wall 655 of the housing 632 is an inner sleeve 656 which has an inside diameter approximately equal to the outer diameter of the piston 634. The inner sleeve 656 is retained in position by one or more shoulders at each end of the housing 632 or from the end cap 658 received within the end 650 of the housing 632. The end cap 658 is sealed in position using C-clips and seals conventional in the art. The interior of the housing 632, the chambers 636 and 638, and the volume between the inner sleeve 656 and the interior wall 655 of the housing 632 are filled with the non-Newtonian flow fluid 660. The non-Newtonian flow fluid 660 in chamber 636 is permitted to flow into chamber 638 through space 662 located at the ends of the inner sleeve 656, and through the peripheral volume between the inner sleeve 656 and the interior wall 655. The flow of fluid from one chamber to the other may be controlled in a number of ways. Primarily the rate of fluid exchange is determined by the size of the smallest opening, defined by either the space 662 or the cross-section of the peripheral passage. The locking power of the mechanism is controlled in substantial respect by the intensity of the magnetic field or flux across those small areas. In the instant invention, a coil is provided which generates an electromagnetic field upon the application of a particular current. Alternatively, permanent magnets may be used, the field of which may be neutralized by the application of electromagnetic field. Although the electromagnetic field is described as occurring at one end of the inner sleeve 656, the electromagnetic force or field may be produced at other areas of the locking mechanism 630 to change the flow state of the non-Newtonian flow fluid 660. For clarity, the type of fluid used in the fluid locking mechanism is substantially similar to the fluid described above, and available from the Lord Corporation. By varying the magnetic flux, the flow characteristic of the non-Newtonian flow fluid 660 is changed. In one state, the non-Newtonian flow fluid 660 is unable to pass through the small space 662, essentially trapping the remainder of the non-Newtonian flow fluid 660 within the respective chambers, and fixing the relative position of the piston 634 within the housing 632. Thus, to change the relative tilt angle of the upper housing assembly 620 with respect to the lower housing assembly 602, the operator simply removes the electromagnetic field present within the fluid locking mechanism 630.

Figure 11:
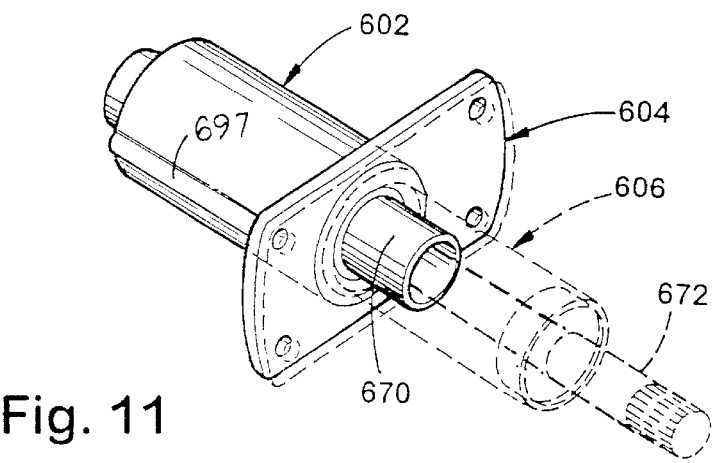
FIG. 11 is an oblique view of an embodiment of the instant invention used for translation of components.
Figure 12:
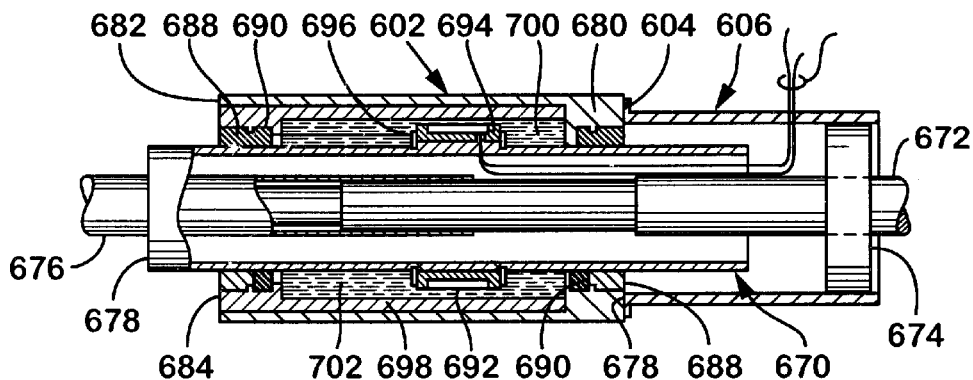
FIG. 12 is a longitudinal section view of the invention shown in FIG. 11.

FIGS. 11 and 12 illustrate another embodiment of the fluid locking mechanism, particularly as it applies to fixing the translation, or telescoping position of two components—in this case, the telescoping steering column. FIG. 11 schematically illustrates the lower housing assembly 602 in relation to the section 606 and the interconnecting flanges 604. Extending longitudinally through the lower housing assembly 602 is an inner tubular member identified by reference numeral 670 which is configured to translate longitudinally with respect to the lower housing assembly 602. For the purposes of illustration, inner tubular member 670 may be equivalent to the inner housing assembly or shuttle 608. Extending concentrically through the inner tubular member 670 may be a telescoping shaft 672 passing through bearing 674 and extending a predetermined distance into the inner tubular member 670. In a preferred embodiment, the portion of telescoping shaft 672 extending within the inner tubular member 670 is splined longitudinally. Telescopically received over the splined end is a second shaft 676 having a female coupling complimentary in shape to the splined end of the telescoping shaft 672. Shaft 676 is intended to extend through the opposite end of the inner tubular member 670 and may be supported by a bearing within end 678 or elsewhere along its length. End 678 of the inner tubular member 670 may be also configured to be interconnected to the brackets such as 612 described above by an adapter member not shown received over the end 678. The attachment member for interconnecting the end 678 of the inner tubular member 670 to the brackets 612 may be of sufficient diameter such that the brackets 612 are located generally parallel and adjacent the exterior of the lower housing assembly 602.

It is contemplated that lower housing assembly 602 may be generally tubular, and substantially closed at one end 678 by an end wall 680. The opposite end 682 may be closed by a removable end cap 684. Both the end wall 680 and the removable end cap 684 may have openings or passages defined therein to receive the inner tubular member 670 there through. Conventional seals and bushings may be provided such as 690 and 688 to provide a fluid-tight seal around the inner tubular member 670.

Intermediate on inner tubular member 670 may be an electromagnetic coil or magnet 692 seated in an armature 694 which is retained generally in place by snap rings 696 seated in groves at each end of the armature 694. In the case of a wire coil mounted on the armature 694, a hole is provided in the armature 694 to allow the wire leads to extend there through and through the inner tubular member 670 for connection to the circuit. To prevent the armature 694 from rotating around the inner tubular member 670, a pin may be provided, extending from the inner tubular member 670, and received in a slot formed in the underside of the armature 694 to fix the rotation of the armature 694 relative to the inner tubular member 670. A similar arrangement may be used, if desired, to fix the relative rotational position of the inner tubular member 670 with respect to the lower housing assembly 602. Alternatively, mechanisms exterior of inner tubular member 670 may prevent rotation. For example, it is contemplated that each bracket 612 may have a slotted structure such as suggested by reference numeral 695 (FIG. 9) which rides over and is engaged by a cam such as suggested by reference numeral 697 (FIG. 11).

Disposed within the interior of the lower housing assembly 602 may be an inner sleeve 698 which has an outside diameter approximately equal to the inside diameter of the lower housing assembly 602 and is positioned between the end wall 680 and the removable end cap 684. The inner diameter of the inner sleeve 698 may vary, but in no event is it less than the outside diameter of the armature 694 and that of the electromagnetic coil or magnet 692. In a preferred embodiment, the inside diameter of the inner sleeve 698 is such that a small gap approximately on the order of 1 to 2 millimeters or less is present between the outside diameter of the armature 694 and the inside diameter of the inner sleeve 698. In this fashion, a narrow passage exists between chamber 700 and chamber 702. The two chambers and the narrow passage interconnecting the two chambers is filled with the non-Newtonian fluid 704 similar to that described above.

When an electromagnetic field exists across the gap between the chambers 700 and 702, the non-Newtonian fluid 704 within that gap, and to a certain degree in each chamber, changes states from a conventional fluid to a more viscous material which is unable to flow through the gap. The particular state of fluid prevents the exchange of fluid between the respective chambers and thus locks the armature 694, and the inner tubular member 670 in position with respect to the lower housing assembly 602. When the electromagnetic field is neutralized, or removed, the non-Newtonian fluid 704 reverts to its natural state, and permitted to flow across the gap from one chamber to the other when inner tubular member 670 is translated. To the extent that shaft 676 also moves with respect to the inner tubular member 670, the spline ends of shafts 676 and 672 permit the relative telescopic adjustment.

In each of the embodiments described above, it is preferred that a nonferrous material be used for the various components which are substantially adjacent or in close proximity to the magnetic/electromagnetic components. The use of nonferrous materials prevents the polarization or magnetization of those components which would result in the continued presence of a magnetic field, thus possibly impacting the function of the locking mechanism. Acceptable materials would include bronze, aluminum, and polymeric materials.

Figure 10:
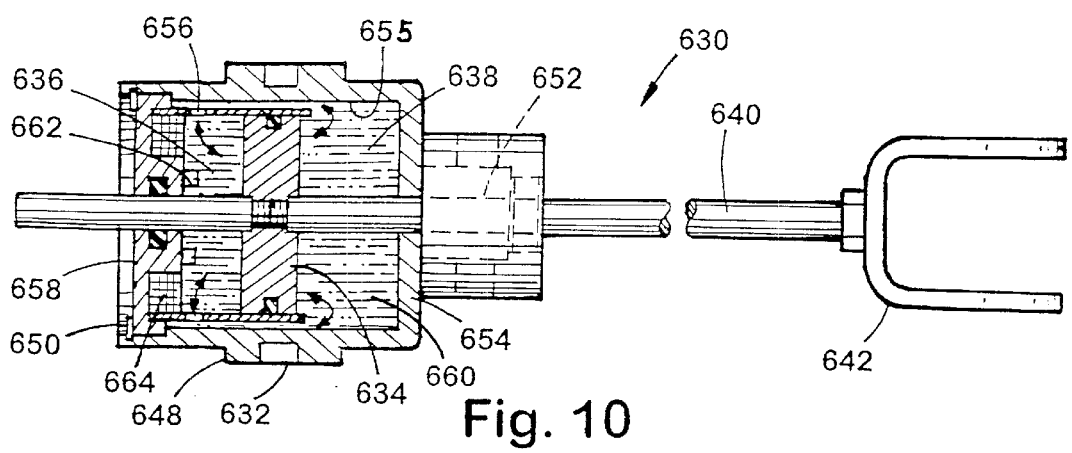
FIG. 10 is an elevation section view of the invention shown in FIG. 9.
Figure 13:
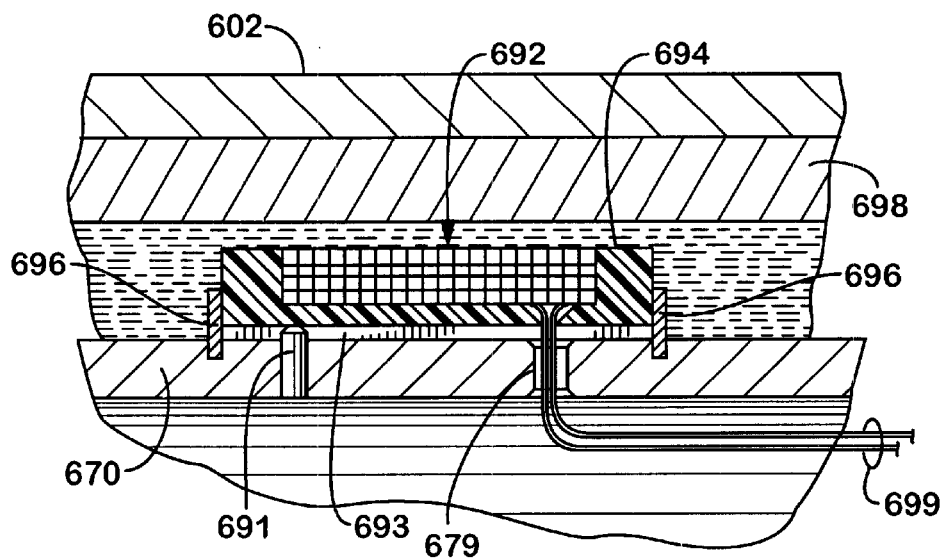
FIG. 13 is a fragmentary section view of the invention shown in FIG. 12.

According to another embodiment of the instant invention used to alert an operator to a safety condition, a steering column assembly 630 such as shown in FIG. 10 is provided which includes a lower housing assembly 602 and an upper housing assembly 620, both interconnected in a manner such that the upper housing assembly 620 is movable with respect to the lower housing assembly 602 in a tilting fashion, telescoping fashion, or both as described generally above. More particularly, it is envisioned that the upper housing assembly 620 is pivotally coupled at its lower end 618 to the upper end of the lower housing assembly 602. Alternatively, the upper housing assembly 620 may be attached to an inner housing assembly or shuttle 608 which is slidably received within the lower housing assembly 602 to permit telescopic movement of the upper housing assembly 620. To fix the relative tilt position of the upper housing assembly 620 with respect to the lower housing assembly 602 may be a fluid locking mechanism 630 such as available from the Lord Corporation and using the magneto-rheological properties of a fluid within a linear actuator to lock interconnected components described generally above. A separate and independent fluid-locking mechanism such as described in FIGS. 12 and 13 may be provided to control the telescoping action of the column.

The fluid locking mechanisms 550 and 630 are interconnected by wire leads (554 on FIG. 8 and marked in FIG. 12) to a logic circuit such as a controller 556 (FIG. 8) which controls the amount of current to lock and unlock the mechanisms. Also connected to the controller 556 by wire (copper or optical) leads are sensors 558, 560, 562, 564, 566 and 559 such as proximity sensors, accelerometers, transducers, piezoelectric sensors and the like. In the embodiment shown, the sensors 559, 561, and 563 are accelerometers and/or transducers which are mounted to the steering column in at least one orientation, and preferably along orthogonal axes. The sensors are intended to provide dynamic feedback to the controller 556 so the locking force of the mechanism can be adjusted to match the natural frequency of the assembly upon the happening of a predetermined event to alert the operator to a specific condition. Also connected to the controller 556 are additional sensors generally indicated by numerals 565 and 567 which are intended to detect a range of conditions, the occurrence of which triggers the alarm to alert the operator.

It is anticipated that the sensors 565 and 567 may be provided to measure certain conditions, such as the proximity of the vehicle to an obstacle, or the operator's state of awareness. For example, the sensors may be provided to monitor the operator's eye movement as shown by sensor 565. Should a low threshold be detected (low eye movement), the controller 556 may assume the operator has fallen asleep or is drowsy and adjust the current to the locking mechanism 552 such that the connection between the two vehicle components 602, 620 matches the natural frequency, waking the operator. In addition, the controller 556 may be coupled to distance sensors such as 567 (DIST. SENS.) which monitor the proximity of the vehicle to other objects or reference points along a road which results in a triggering of the "natural frequency" alarm. Alternatively, the device under control may also produce an audible signal when set to the natural frequency. Such audible signals could also be used to alert the operator to the occurrence of a condition. For example, the device may be attached to a diaphragm or transducer or other material which resonates at a particular audible frequency to alert the operator. For visual signals the locking device may be used to control the natural frequency of a piezoelectric transducer such that when the frequency is matched, an electrical current is generated to illuminate an indicator or produce an audible signal.

In addition to using the natural frequency of a vehicle component or assembly, such as the steering column to alert the operator, the instant invention can be used in conjunction with a component or assembly to avoid the natural frequency. The fluid locking mechanism 630 and associated circuitry could be implemented in a manner to couple the components such that the natural frequency is avoided, thus producing the smooth and desired operation of the vehicle. The implementation of this assembly may also result in a reduction of the front-end engineering cost associated with avoiding the natural frequency problem associated with certain parts/assemblies.

The electrical circuit anticipated to be used to carry out the instant invention can assume a wide array of configurations. Once one of ordinary skill of the art in electrical engineering, once in possession of the goals of the instant invention, could produce a circuit which could receive the different outputs from the various sensors and compare them to predetermined thresholds. This same individual, knowing the natural frequency of the component coupled to the magneto-rheological device, and how to adjust the magneto-rheological device to either avoid or achieve the natural frequency, could produce a circuit wherein the natural frequency is avoided unless certain criterion are indicated by the sensors.

Various changes, alternatives and modifications will become apparent to those of ordinary skill in the art following a reading of the foregoing description. For example, although electromagnets have been described, it will appreciate that permanent magnets may be utilized to provide some or all of the magnetic field. The intensity or strength of the magnetic flux through the fluid may be changed by altering the distance of the magnet from the RIP or cylinder. It is further contemplated that the instant invention may be adapted for use in controlling the rotation of a steering wheel shaft, or similar structure using a device described in U.S. Pat. Nos. 5,492,312; 5,711,746; and 5,816,372 issued in the name of the Lord Corporation. With the advent of electrical steering systems, it is also contemplated that these devices could be used to provide adjustable tactile feedback through the steering wheel to provide the operator with a range of steering control settings. In yet another application, the locking mechanism may be operably coupled to a force sensor located in the steering wheel of the vehicle via a computer. The sensor would generate a signal which would be processed by the computer to vary the flux in the locking mechanism during an accident wherein the locking mechanism would accommodate and absorb some of the energy resulting from the impact of the occupant with the steering wheel. Lastly, a different implementation of the locking system would include adjusting the relative position of structures such as seats and structures such as instrument panels and the like. It is intended that all such changes, alternatives and modifications have come within the scope of the foregoing description be considered as part of the present invention.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

I claim as my invention:

1. An apparatus for alerting a vehicle operator to a specific condition, comprising:
    a magneto-rheologic assembly;
    a vehicle component coupled to said magneto-rheologic assembly;
    at least one sensor at a first location for detecting an occurrence of the specific condition and producing an output signal; and
    a circuit interconnected to said sensor and to said magneto-rheologic assembly for changing a condition in said magneto-rheologic assembly and said vehicle component in response to said output signal received from said at least one sensor, said change in condition permitting said vehicle component to vibrate at a natural frequency generating at least one of a vibration and an audible signal in said vehicle component for sensing by the operator to alert the operator to the specific condition.

2. The apparatus as defined in claim 1, wherein said vehicle component is coupled to a control.

3. The apparatus as defined in claim 1, wherein said magneto-rheologic assembly is coupled to a resonating vehicle component which produces an audible signal when at said natural frequency.

4. The apparatus as defined in claim 1, wherein said magneto-rheologic assembly is attached to a portion of a seat for the operator through which said signal is sensed by said operator.

5. The apparatus as defined in claim 1, wherein said at least one sensor monitors a relative distance between two points.

6. The apparatus as defined in claim 1, wherein said at least one sensor monitors operator awareness.

7. The apparatus as defined in claim 1, wherein said circuit includes one of a controller, a programmable logic circuit, a computer, and a dedicated hard-wired circuit.

8. The apparatus as defined in claim 1, further including apparatus attached to said vehicle component for providing dynamic feedback to said circuit.

9. The apparatus as defined in claim 2, wherein said control includes at least one of a steering wheel, a control stick, an accelerator, and a shifter assembly.

10. A dynamically controlled alarm assembly, comprising:
    a vehicle control component having a natural frequency;
    a magneto-rheological device attached to said vehicle control component and controlling an occurrence of said natural frequency in said vehicle control component;
    a first sensor for monitoring a desired characteristic;
    a second sensor at a location different from that of said first sensor and for monitoring said natural frequency of said vehicle control component; and
    a circuit interconnected to said first sensor, said second sensor, and said magneto-rheologic device for controlling said natural frequency of said vehicle control component by changing a characteristic of said magneto-rheologic device in response to feedback from said first and second sensors.

11. The dynamically controlled alarm assembly as defined in claim 10, wherein said vehicle control component produces an audible signal when at said natural frequency.

12. The dynamically controlled alarm assembly as defined in claim 10, wherein said vehicle control component produces a tactile signal when at said natural frequency.

13. The dynamically controlled alarm assembly as defined in claim 10, wherein said vehicle control component produces a visual signal when at said natural frequency.

14. The dynamically controlled alarm assembly as defined in claim 10, wherein said natural frequency of said vehicle control component is tunable.

15. The dynamically controlled alarm assembly as defined in claim 10, wherein said vehicle control component includes at least one of a control, a seat, and a display.

16. The dynamically controlled alarm assembly as defined in claim 10, wherein said first sensor detects a relative change in predetermined parameters.

17. The dynamically controlled alarm assembly as defined in claim 10, wherein said circuit includes at least one of a controller, a computer, and a dedicated hard-wired circuit.

18. The dynamically controlled alarm assembly as defined in claim 10, wherein said magneto-rheological assembly includes a non-Newtonian flow fluid locking assembly.

19. An alarm system, comprising:
    a non-Newtonian flow fluid locking assembly;
    a vehicle component having a natural frequency, coupled to said non-Newtonian flow fluid locking assembly, said vehicle component producing at least one of an audible, tactile, and visual signal when at said natural frequency;

at least a first sensor mounted to said vehicle component to monitor said natural frequency of said vehicle component;

at least a second sensor spaced from said first sensor for detecting the occurrence of a predetermined condition; and a circuit assembly operably interconnected to said first and second sensors and to said non-Newtonian flow fluid locking assembly for monitoring said first and second sensors and changing a condition of said non-Newtonian flow fluid locking assembly in response thereto such that upon the occurrence of said predetermined condition, said non-Newtonian flow fluid locking system permits said vehicle component to achieve said natural frequency and produce said at least one of said audible, tactile and visual signal.

* * * * *